United States Patent [19]

Richard et al.

[11] Patent Number: 5,503,670
[45] Date of Patent: Apr. 2, 1996

[54] METAL FIBER CONCRETE COMPOSITIONS FOR MOLDING CONCRETE ELEMENTS, ELEMENTS OBTAINED AND CURING PROCESS

[75] Inventors: Pierre Richard, Neuilly sur Seine; Marcel H. Cheyrezy, Sevres; Nicolas Roux, Montigny le Bretonneux, all of France

[73] Assignee: Bouygues, Saint Quentin Yvelines, France

[21] Appl. No.: 268,588

[22] Filed: Jun. 30, 1994

[30] Foreign Application Priority Data

Jul. 1, 1993 [FR] France ................................. 93 08063
Mar. 10, 1994 [FR] France ................................. 94 02801

[51] Int. Cl.⁶ .......................... C04B 14/38; C04B 14/48
[52] U.S. Cl. .......................... 106/643; 106/644; 106/713; 106/714; 106/737; 428/378; 428/379
[58] Field of Search ........................... 106/644, 713, 106/643, 711, 769, 721, 737, DIG.1, 714, 823; 428/105, 323, 703, 378, 379, 389

[56] References Cited

U.S. PATENT DOCUMENTS 4,482,385  11/1984  Satkowski et al. .
4,513,040   4/1985  Lankard ........................ 428/48
4,559,881  12/1985  Lankard et al. .
4,593,627   6/1986  Lankard et al. .
4,668,548   5/1987  Lankard ........................ 428/63
4,979,992  12/1990  Bache .

FOREIGN PATENT DOCUMENTS

0273181  7/1988  European Pat. Off. .
2640962  6/1990  France .

*Primary Examiner*—Paul Marcantoni
*Attorney, Agent, or Firm*—Lowe, Price, LeBlanc & Becker

[57] ABSTRACT

A metal fiber concrete composition for molding a concrete element, the composition being essentially constituted by a Portland cement, granular elements, fine elements for pozzolan reaction, metal fibers, a dispersing agent, optionally other additives, and water. The preponderant granular elements have a maximum grain size D of not more than 800 micrometers. The preponderant metal fibers have individual lengths 1 lying in the range 4 mm to 20 mm. The ratio R of the mean length L of the fibers divided by said maximum size D of the granular elements is not less than 10. The amount of preponderant metal fibers is such that the volume of preponderant metal fibers lies in the range 1.0% to 4% of the volume of the concrete after setting.

28 Claims, 10 Drawing Sheets

FIG.1(A)
PRIOR ART

FIG.1(B)
INVENTION

METAL FIBER CONCRETE COMPOSITIONS FOR MOLDING CONCRETE ELEMENTS, ELEMENTS OBTAINED AND CURING PROCESS

FIELD OF THE INVENTION

The invention relates to metal fiber concrete for molding concrete elements.

BACKGROUND OF THE INVENTION

"Metal fiber concrete" as used herein, is intended to mean a body of cementitious matrix including metal fibers and obtained by setting of a cementitious composition mixed with water.

"Concrete element" as used herein, is intended to mean columns, beams, slabs, walls, panels, protective panels, cladding panels and any decorative or structural element used in a construction.

Conventional concrete has a granular structure made up of the following three phases:
- cement which constitutes the binding phase and has a grain size lying in the range 1 micrometer to 100 micrometers;
- sand which has a grain size lying in the range 1 mm to 4 mm; and
- coarse aggregate having a size lying in the range 5 mm to 20 mm, or 5 mm to 25 mm.

Conventional metal fiber concretes include steel fibers of length lying in the range 30 mm to 60 mm. The maximum length of fiber that can be used is limited firstly by the need to be able to perform mixing without excessive damage, and secondly by the casting requirements for the concrete (putting into place and vibration).

Smooth metal fibers are held in place in the concrete by adhesion. To ensure that a smooth fiber behaves well, it is important that the form factor, that is the length of the fiber divided by its diameter, lies in the range 50 to 100. This optimum form factor may be smaller if fiber anchoring is improved by a change in fiber shape: corrugations, end hooks, undulation, etc. . . . .

The concentrations of fibers in conventional metal fiber concretes lie in the range 30 $kg/m^3$ to 150 $kg/m^3$. They generally lie in the range 40 $kg/m^3$ to 80 $kg/m^3$, which corresponds to a volume percentage lying in the range 0.5% to 1%.

Fiber length L generally lies in the range 30 mm to 60 mm, whereas the diameter D of the coarsest aggregates generally lies in the range 20 mm to 25 mm, such that the ratio R=L/D lies in the range 1.2 to 3.0.

In conventional concrete, the interface between aggregate and set cement constitutes a zone of weakness because of its greater porosity (transition area). This interface is also the seat of local stresses due to the anisotropic behavior between the aggregate and the cement. When overall traction is applied to the concrete, the aggregates can no longer remain tied together unless there exist fasteners that withstand the traction and that extend over a length of not less than about ten times the size of the coarsest aggregate.

Since the ratio R is no more than 3.0, fibers are not effective in tying individual aggregates together.

That is confirmed by the fact that adding metal fibers to traditional concrete provides little improvement to the tensile strength (flexural strength) of the concrete. The improvement is of the order of a few percents for the usual fiber concentrations of 0.5% to 1% by volume.

The metal fibers used in concretes that do not include conventional reinforcement do not enable cracking of the concrete to be avoided, it only improves crack distribution, i.e. a large number of microcracks are obtained that are "sewn-together" by the fibers, instead of obtaining a smaller number of cracks that are larger.

Consequently, the use of conventional metal fiber concretes without conventional passive reinforcement is limited.

Particular cementitious compositions and processes are known for obtaining cementitious matrix comprising metal fibers (COMPRESIT, SIFCON, and others) and are disclosed f.i. in the U.S. Pat. Nos. 4,979,992 to H. H. BACHE, 4,513,040, 4,559,881, 4,593,627 and 4,668,548 to D. R. LANKARD.

OBJECTS AND SUMMARY OF THE INVENTION

The present invention concerns new specific cementitious compositions for preparing concrete element exhibiting an outstanding combination of a high flexural strength and a very ductile behavior.

An object of the invention is to provide concrete element usable without conventional passive reinforcement while having traction strength (flexural strength) lying at least in the range 30 MPa to 60 MPa.

Another object of the invention is to provide concrete elements having fracture energy lying at least in the range 10,000 $J/m^2$ to 40,000 $J/m^2$.

Another object of the invention is to provide a concrete elements having an ultimate flexural strain, at least in the range $4000.10^{-6}$ m/m to $9000.10^{-6}$ m/m.

An object of the invention is also to provide concrete elements having compressive strength lying at least in the range 150 MPa to 250 MPa.

Another object of the invention is provide concrete elements having strength intensity factor at least in the range of 6 MPa $m^{0.5}$ to 13 MPa $m^{0.5}$.

An object of the invention is also to provide concrete elements having the same performances than obtained with conventional concretes, but with a much lower quantity of concrete, typically up to a weight ratio of 1 (concrete of the invention) to at least 2.5 (conventional concrete).

Another object of the invention is to provide a fiber metal concrete composition allowing to mold shapes which could not be obtained with conventional concretes.

Another object of the invention is to provide a metal fiber concrete composition pecularly advantageous for making prestressed members or structures.

A metal fiber concrete composition according to the invention for molding a concrete element is essentially constituted by a Portland cement, granular elements, fine elements that react in the manner of pozzolan, metal fibers, dispersing agent, optionally other additives, and water, wherein the preponderant granular elements have a maximum grain size D of not more than 800 micrometers, wherein the preponderant metal fibers have individual lengths l lying in the range 4 mm to 20 mm, wherein the ratio R of the mean length L of the fibers divided by said maximum size D of the granular elements is not less than 10, and wherein the amount of the preponderant metal fibers is such that the volume of said preponderant metal fibers lies in the range 1.0% to 4.0% of the volume of the concrete after setting.

Such composition when the components are mixed produces after setting a solid body of metal fiber concrete.

The term "preponderant granular elements" is used to designate granular elements that represent at least 90%, preferably at least 95%, or better still at least 98% of the total mass of the granular elements.

The term "preponderant metal fibers" is used to designate metal fibers representing not less than 90%, preferably not less than 95%, and better still not less than 98% of the total mass of metal fibers.

Ideally, the preponderant granular elements constitute all of the granular elements and the preponderant metal fibers constitute all of the metal fibers.

In particularly advantageous embodiments:

D is not more than 600 micrometers, or better not more than 400 micrometers (where sizes of 800, 600, and 400 micrometers approximatively correspond respectively to equivalent screen sizes of 30, 29, and 27 in the AFNOR NF X 11-501 series);

l lies in the range 8 mm to 16 mm, or better in the range 10 mm to 14 mm; and the diameter of the preponderant metal fibers lies in the range 80 micrometers to 500 micrometers, or better in the range 100 micrometers to 200 micrometers;

the volume percentage of the preponderant metal fibers lies in the range 2.0%–3.0%, preferably about 2.5%, of the volume of the concrete after setting;

the said granular elements substantially are fine sands, preferably of the group constituted by sift natural sand, crushed sand or other fine sands;

the Portland cement is a cement of the group constituted by Portland cement type V or type III and more preferably high silica modulus cement;

the metal fibers are fibers of the group constituted by steel fibers, stainless steel fibers and steel or stainless steel fibers coated with a non ferrous metal such as copper, zinc and other non ferrous metal; or metal alloy;

the said fine elements having a pozzolan reaction are elements of the group constituted by silica, fly ashes and blast furnace slags having a mean granular size of less than 0.5 micrometers;

the dispersing agent is a superplasticizer of the group constituted by naphtalene, melamine, polyacrylate and other superplasticizers.

In a typical example, the aggregate in the mixture for making concrete has a diameter of not more than 400 micrometers and the metal fibers are more than 12 mm long, thereby obtaining a ratio R=30.

The behavior of a 12 mm long fiber in the matrix of concrete made from reactive powder is analogous to the behavior of conventional smooth reinforcement of length $L=R\times D$, id est $L=30\times 20=600$ mm.

The mechanical behavior of the concrete of the invention is therefore identical to the mechanical behavior of conventional reinforced concrete having conventional reinforcement of length 600 mm.

In a preferred embodiment, the composition comprises per 100 parts by weight of cement: 60 to 150 (or better 80 to 130) parts by weight of fine sand having a mean grain size of 150 to 400 micrometers; 10 to 40 (or better 20 to 30) parts by weight of amorphous silica having a mean grain size of less than 0.5 micrometers; 10 to 80 (or better 15 to 40) parts by weight of metal fibers having a mean length lying in the range 10 mm to 14 mm, at least 0.5 p. by weight (dry extract) of a dispersing agent, optional additives, and 10 to 30, preferably 10 to 24, and more preferably 12 to 20 parts by weight of water.

Preferably the silica is silica fume.

The invention is not limited to the use of a particular dispersing agent, but preference is given to a superplasticizer of the polyacrylate type over superplasticizers of the melamine or of the naphthalene types. It is preferable to use at least 0.5, or better at least 1.2, or still more preferably about 1.8 parts by weight of superplasticizer (dry extract) for 100 parts by weight of cement.

The concrete of the invention may be prepared by mixing the solid ingredients and water in conventional manner.

The resulting concrete is preferably subjected to curing at a temperature lying between ambient and 100° C., in particular curing in the range 60° C. to 100° C., and preferably at a temperature of about 90° C.

The duration of curing preferably lies in the range six hours to four days, with the optimum duration being of the order of two days, the heat curing starting after the end of the setting of the mixture;

Curing is performed under dry conditions or under wet conditions or in cycles of alternating wet and dry conditions, e.g. six to twenty-four hours curing under wet conditions, followed by six to twenty-four hours curing under dry conditions.

The heat curing is applied to concretes after the setting, preferably at least one day after the setting and more preferably at least seven days after the setting.

Typically the concrete is cured according one of the following processes:

at about 60°–100° C. during about 6 hours to 4 days starting after the end of the setting;

at about 60°–100° C. during about 12 hours to 24 hours starting after the end of the setting;

at about 60°–100° C. during about 6 hours to 4 days, starting at least one day after the beginning of the setting;

at about 70°–90° C. during about 6 hours to 4 days after the end of the setting.

The addition of crushed quartz powder (CQP) is particularly useful when the concrete is cured at high temperature, as this is exemplified in the following table:

|  | Compressive strength | Flexural strength |
| --- | --- | --- |
| without CQP | 230 MPa | 52 MPa |
| with CQP | 250 MPa | 60 MPa |

The following table compares the characteristics of the concrete of the invention with other concretes.

|  | Tensile strength (3-point flexural strength) MPa | Fracture energy J/m² | Stress intensity factor Klc MPa · m^0.5 | Compressive strength MPa |
| --- | --- | --- | --- | --- |
| C25 to C40 Conventional concrete | 2 to 3 | 90 to 120 | 1.8 to 2.5 | 25 to 40 |
| High and very high performance concretes | 4 to 5 | 120 to 150 | 2.2 to 2.9 | 50 to 100 |
| Concrete of the invention | 30 to 60 | 10,000 to 40,000[3] | 6 to 13 | 150[1] to 250[2] |

[1] After 28 days of curing at ambient temperature
[2] After two days of precuring at ambient temperature followed by hot curing at 80–90° C.
[3] Depending on the type of hot-curing applied and the amount of steel fibers used (from 1% to 4% by volume)

The invention is not limited to the use of a particular silica; when the silica is a silica fume, a fumed silica from the zirconium industry rather than a fumed silica from the silicon industry is used preferably.

In various embodiments, the silica may be partially or totally substituted by other pozzolanic materials such as fly ashes, blast furnace slags, for example.

BRIEF DESCRIPTION OF THE DRAWINGS

The invention will be explained further in more details, in reference to the drawings on which.

FIG. 11 is a transverse cross section of the beam at span (FIG. 11A) and at bearing FIG. 11B);

DESCRIPTION OF THE PREFERRED EMBODIMENT

Figure 1A:
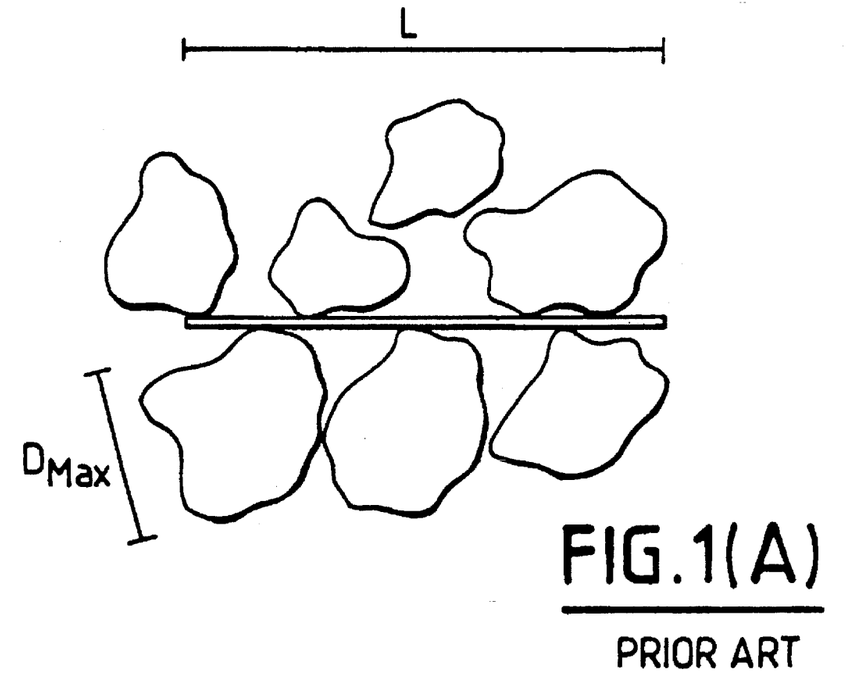
FIG. 1A is a scheme of the microstructure of a concrete according to the prior art.
Figure 1B:
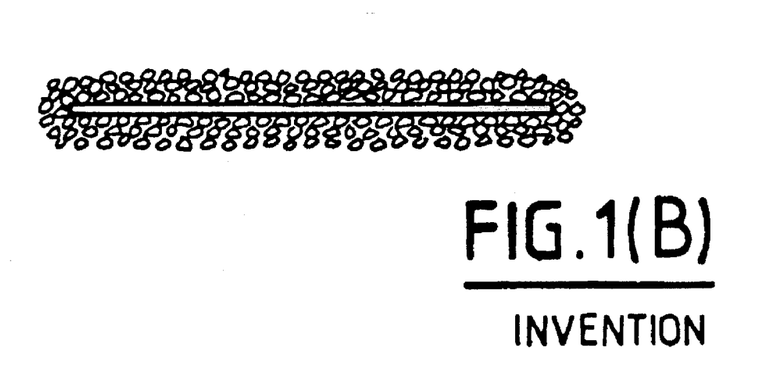
FIG. 1B is a scheme of the microstructure of a concrete according to the invention.
Figure 2:
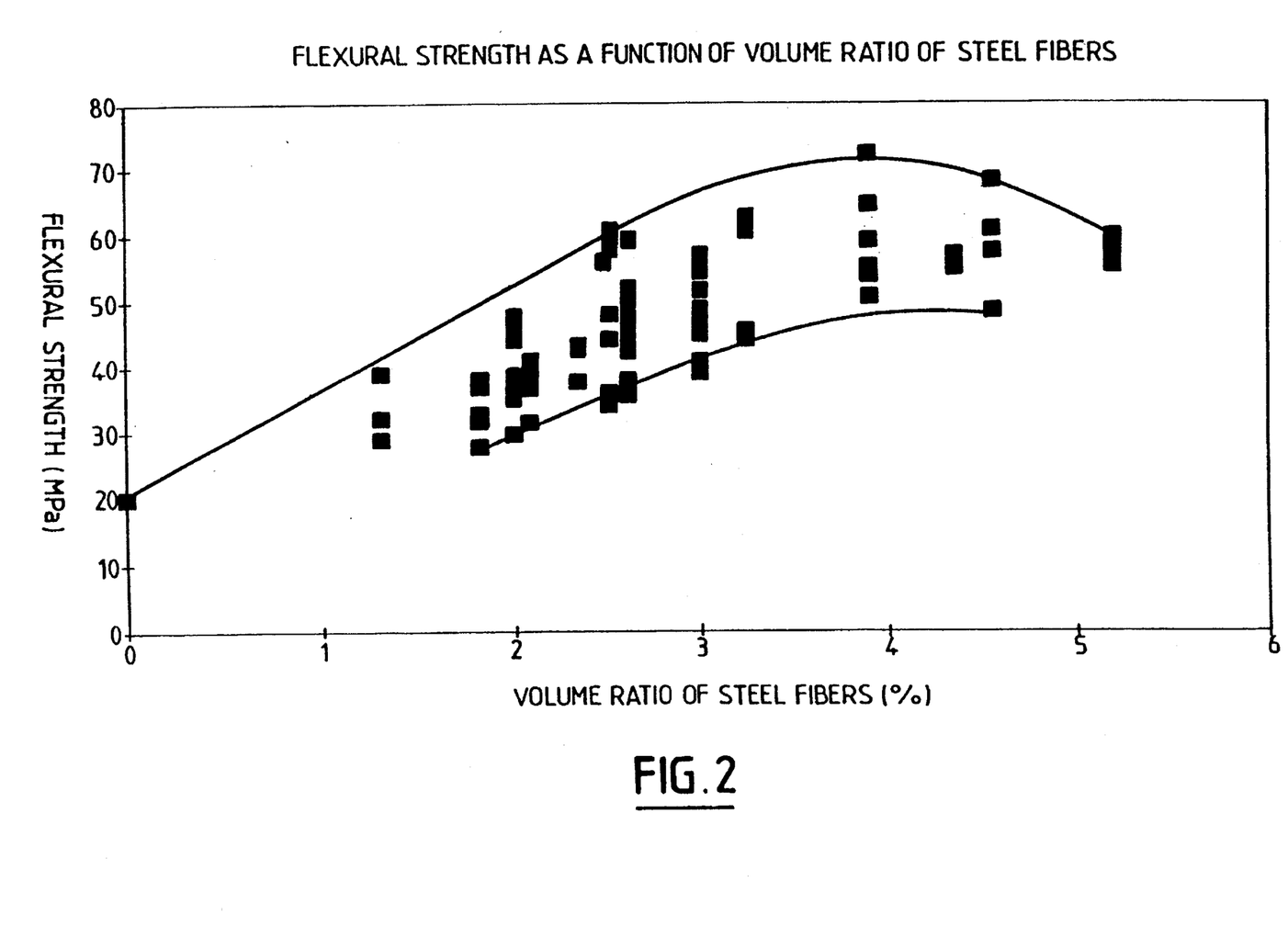
FIG. 2 is a curve of the flexural strength of a concrete according to the invention as a function of the volume ratio of steel fibers.
Figure 3:
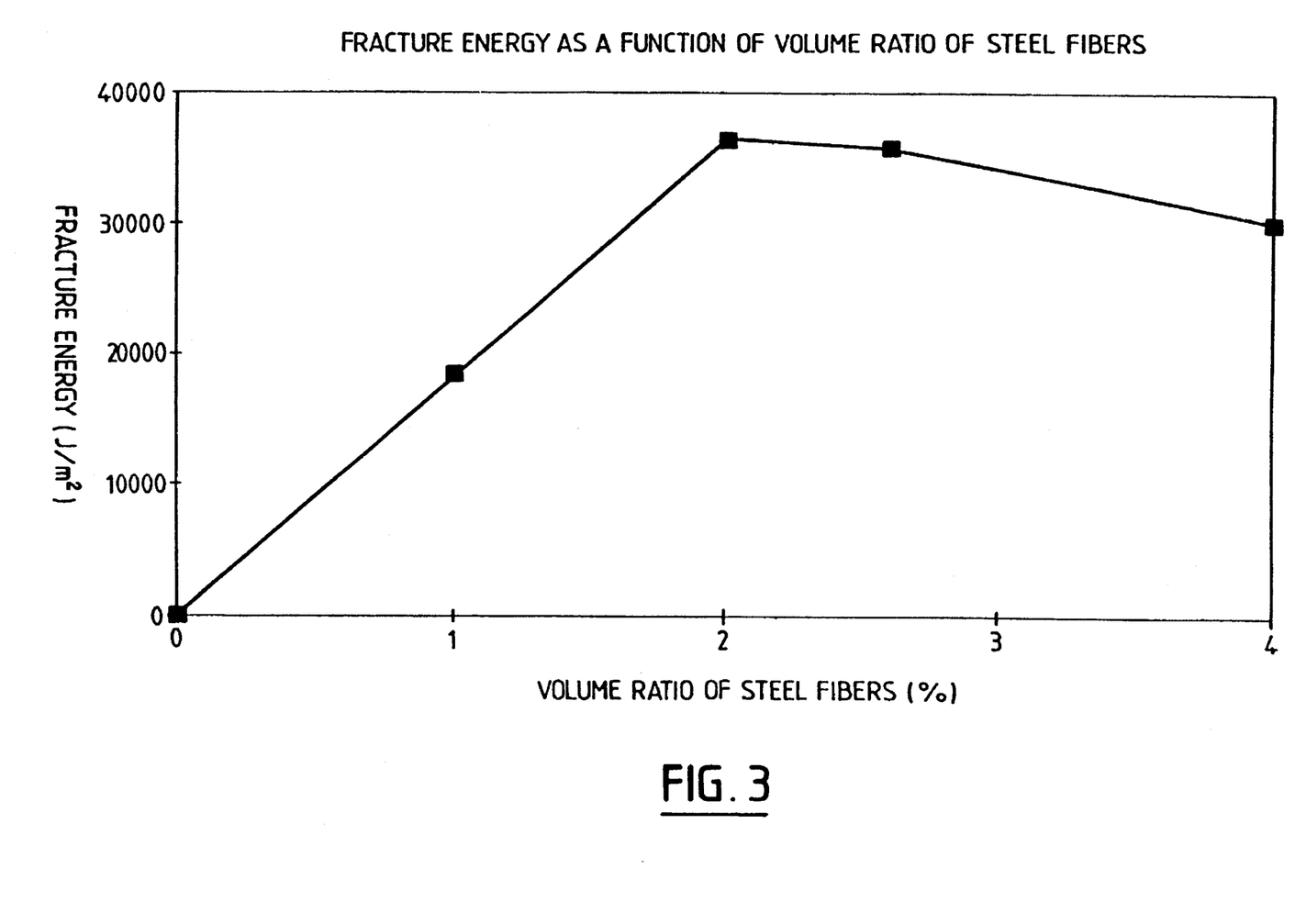
FIG. 3 is a curve of the fracture energy of a concrete according to the invention as a function of the volume ratio of the steel fibers.
Figure 4:
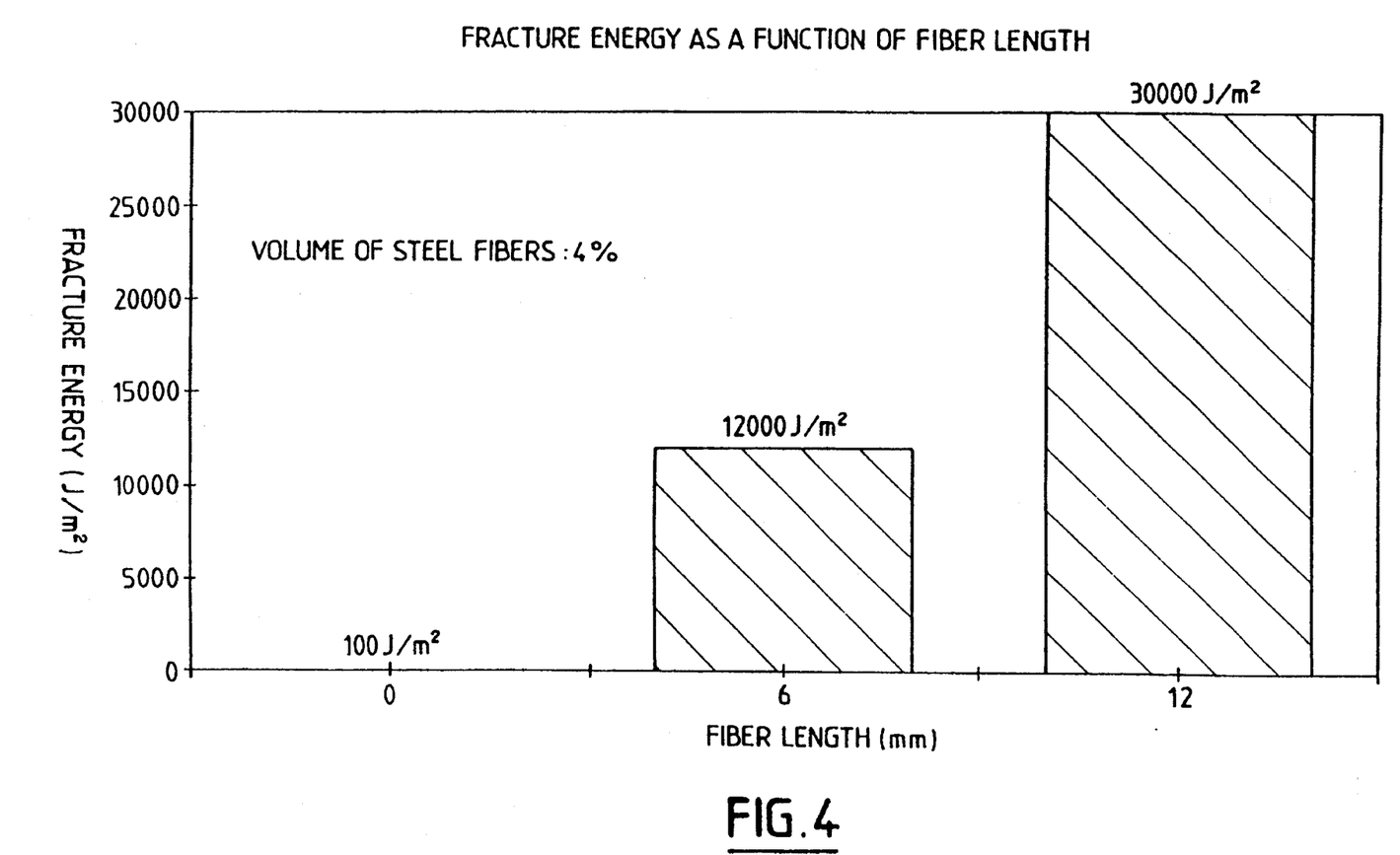
FIG. 4 is a curve of the fracture energy of a concrete according to the invention as a function of the length of the fibers.
Figure 5:
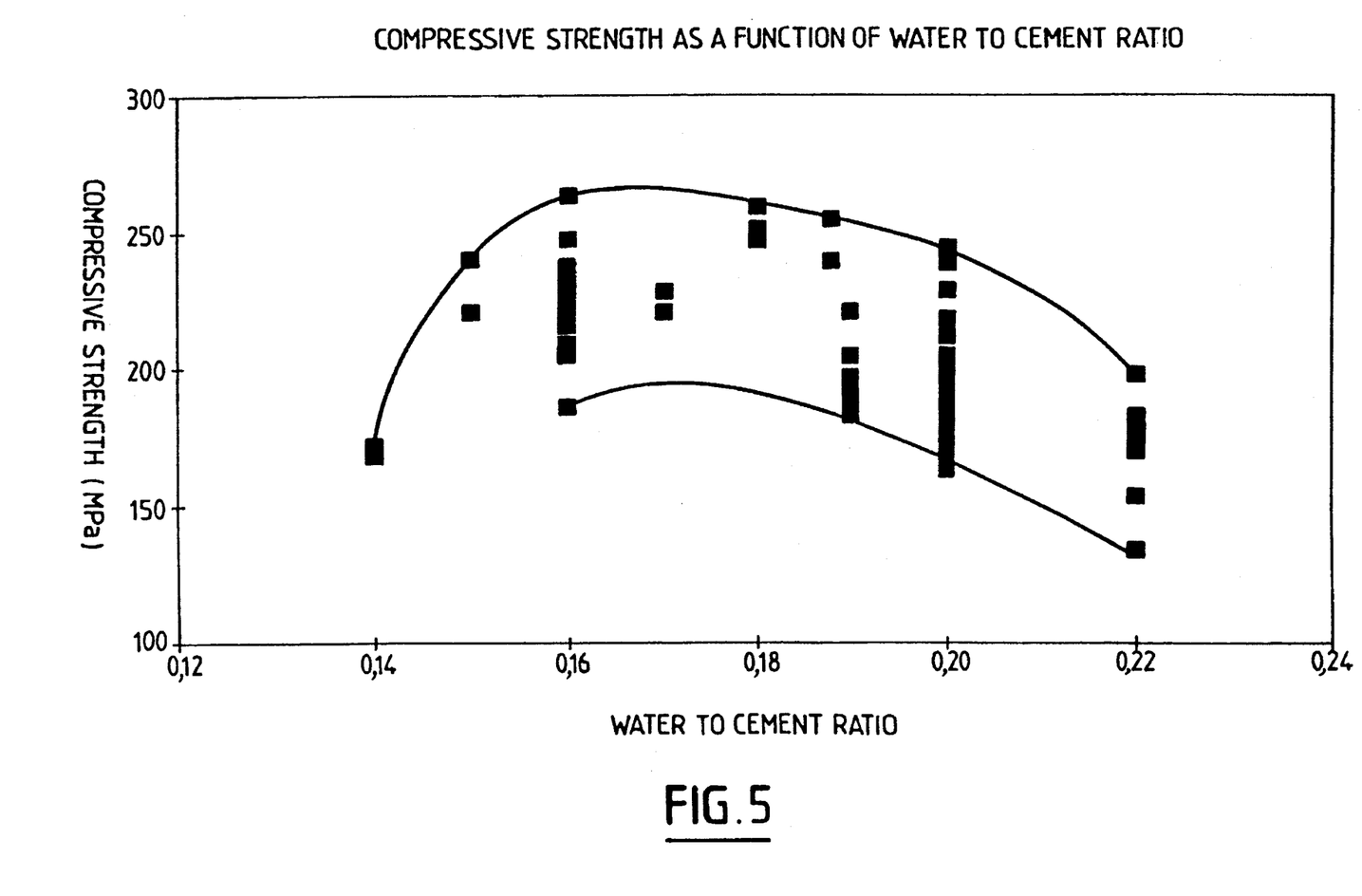
FIG. 5 is a curve of the compressive strength of a concrete according to the invention as a function of the water to cement ratio.
Figure 6:
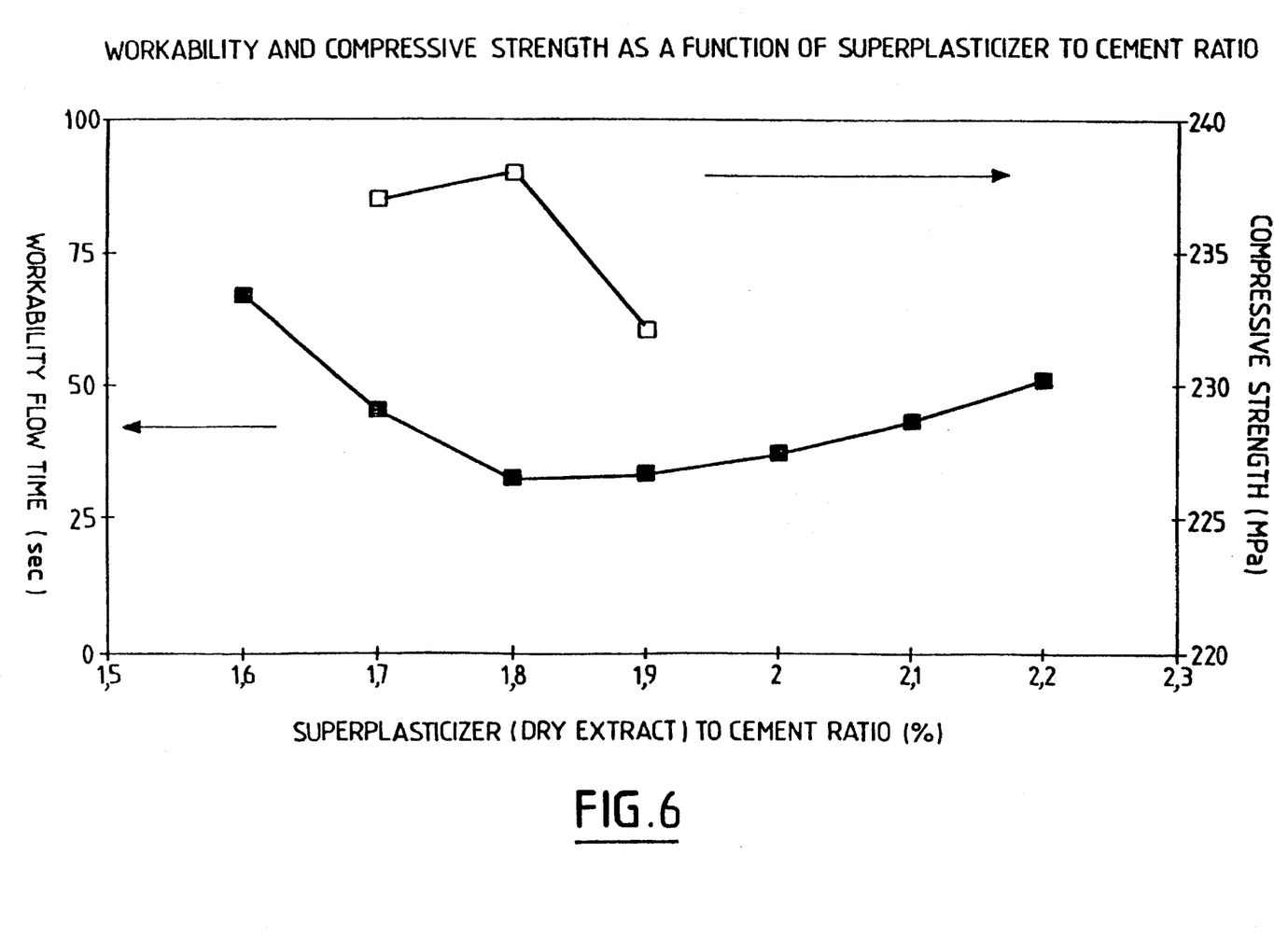
FIG. 6 is a curve of the workability and compressive strength of a concrete according to the invention and including COP as a function of the super plasticizer to cement ratio.
Figure 7:
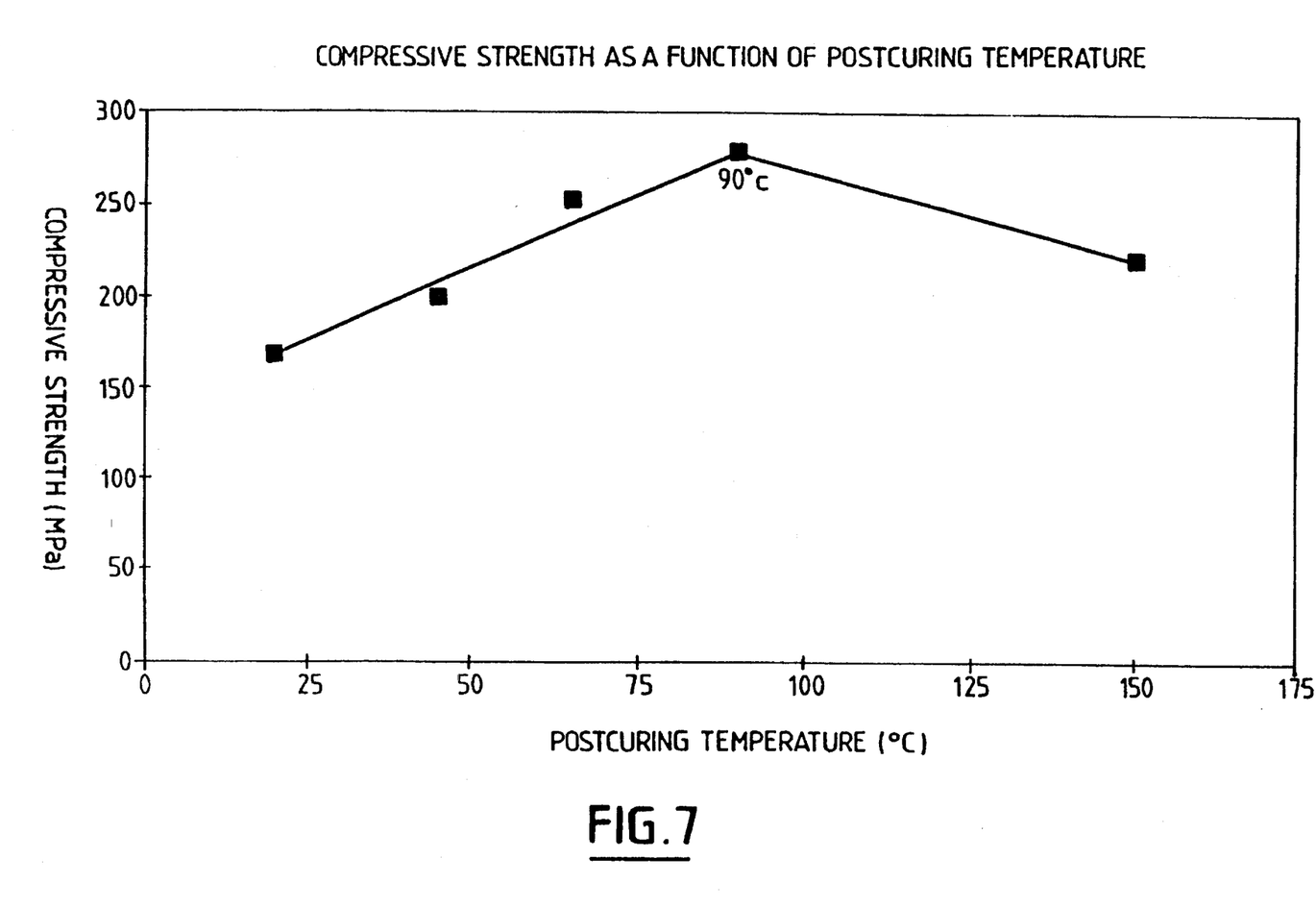
FIG. 7 is a curve of the compressive strength of a concrete according to the invention as a function of the temperature of postcuring.

FIG. 1 is a diagram showing how metal fibers work in a concrete of the invention, as compared with conventional passive reinforcement: FIG. 1A is a diagram of a fiber of length L=60 mm surrounded by pieces of aggregate having a maximum diameter D=25 mm, such that the ratio R:L/D max=2.4; while FIG. 1B is a diagram (on a different scale) of a metal fiber surrounded by pieces of aggregate in concrete of the invention with L=12 mm and Dmax=0.4 mm.

FIGS. 2 to 7 are curves showing the variation of some properties of a concrete according to the invention, as a function of various parameters (ratio of the steel fibers, length of the steel fibers, water to cement ratio, superplasticizer to cement ratio, temperature of postcuring).

It is clear from the drawings that:

the best percentage of fibers for which concerns the flexural strength is about 3.5 (in volume), the best percentage of fibers for which concerns the fracture energy is about 2.0 to about 2.5, the best water to cement ratio is about 0.16 to about 0.18, the best plasticizer (dry extract) to cement ratio is about 1.8% in case of a polyacrylate, when COP is used;

the best curing temperature is about 80° to about 90° C.

The invention will be still illustrated hereafter by some illuminating examples.

EXAMPLE I

A typical composition for preparing a metal fiber concrete according to the invention is given in Table 1 hereinafter:

TABLE 1

| Typical composition | |
| --- | --- |
| Portland cement - Type V | 955 kg/m³ |

TABLE 1-continued

| Typical composition | |
| --- | --- |
| Fine quartz sand (150–300 micrometers) | 1051 kg/m³ |
| Silica | 239 kg/m³ |
| Superplasticizer (polyacrylate) | 13 kg/m³ |
| Calibrated Steel fibers (L = 12.5 mm, ø = 0.18 mm) | 191 kg/m³ |
| Total water | 153 l/m³ |

Silica is mostly undensified silica fume (18 m²/g).

The steel fibers are straight and smooth.

Even though the water-cement ratio is low this concrete can be mixed, cast and vibrated in the same way as conventional concrete.

Figure 8:
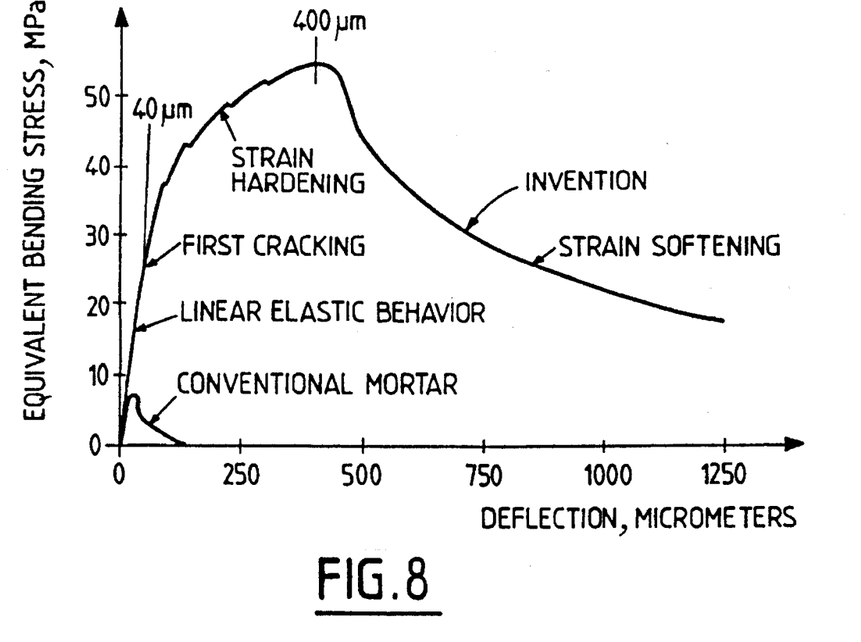
FIG. 8 is a curve of the flexural strength of a concrete according to the invention comparatively to a conventional mortar.

Variation in flexural strengths and fracture energies are governed by the percentage of fibers added. FIG. 8 shows the behavior of a conventional mortar and of a concrete according to the invention during a three-point bending test performed on notched samples. It can be seen that a concrete according to the invention exhibits a great strain-hardening stage followed by gradual strain-softening. The maximum flexural stress reached is twice as high as the stress at first cracking (50 MPa and 25 MPa respectively). The displacement at maximal stress is approximately ten times greater than the displacement at the opening of the first micro crack.

Figure 9:
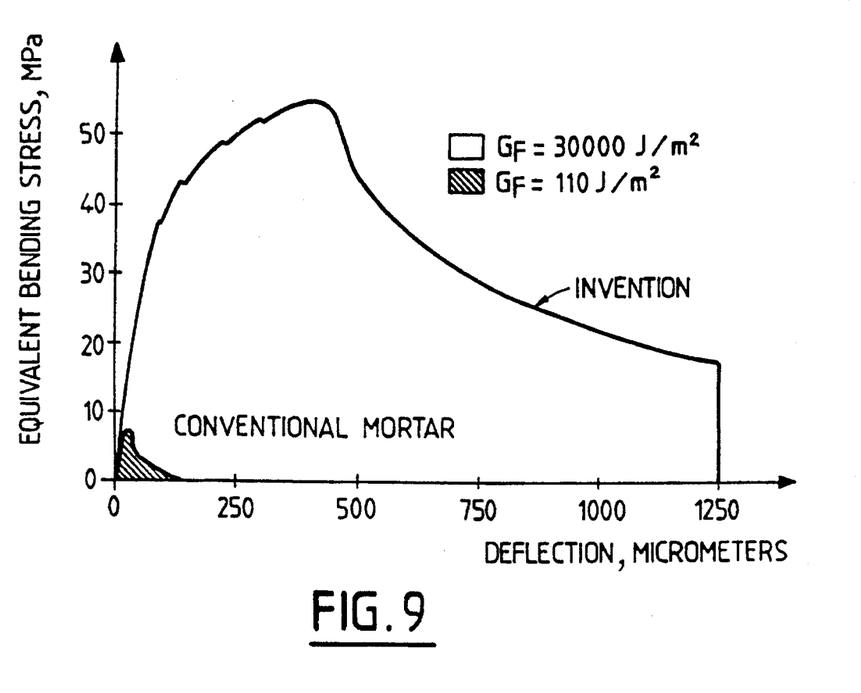
FIG. 9 is a curve of fracture energies of a concrete according to the invention comparatively to a conventional mortar.

FIG. 9 shows the results obtained during 3-point bending tests performed on notched test pieces of 4 cm by 4 cm by 16 cm. The fracture energy, proportional to the area underneath the stress/strain curves typically is 30000 J/m² for a concrete according to the invention and less than 100 J/m² for conventional mortar.

The concrete of the invention can be used without passive reinforcement.

In a traditional concrete structural element comprising reinforcing steels, it is necessary to have steels at 1 to 5 cm (at maximum 10 cm) from the surface of the element, with the result that the width of the member must be at least 7 cm when the element is molded horizontal and 12 cm when the element is molded vertical. With the concrete of the invention, due to the fact that the reinforcing steels are no more necessary, it becomes possible to mold element having a minimum width of 8 mm (when molded horizontal) and 20 mm (when molded vertical). Thus it becomes possible to mold shapes which could not be obtained with conventional concrete and to reduce considerably the quantity of concrete, typically from at least 2.5 to 1.

The concrete of the invention can also be used in prestressed structural elements without passive reinforcement.

The concrete according to the invention is pecularly advantageous for making prestressed structural element since the properties of the concrete are such that the reinforcing steels, usually required to make the structural element able to withstand to the stresses generated at the ends of the element by the prestressing, are no more necessary.

Preferably the concrete structural element, when prestressed, is stressed before setting by wires, bars or strands adhering to the concrete of the element or stressed after setting by multi-wire tendons, bars or multi-strand tendons passing through a sheath or by strands sheathed and greased.

EXAMPLE II

A Tshaped beam is cast with a concrete having the following composition (fiber ratio: 2.6% by volume):

TABLE 2

| Portland cement type V | 879 kg/m³ |
| --- | --- |
| Fine Sand (150–400 micrometers) | 966 kg/m³ |
| Silica Fume | 219 kg/m³ |
| Superplasticizer (dry exact) | 13 kg/m³ |
| Total water | 193 l/m³ |
| Calibrated steel fibers (L = 12 mm, ø = 0.18 mm) | 198 kg/m³ |

Figure 10:
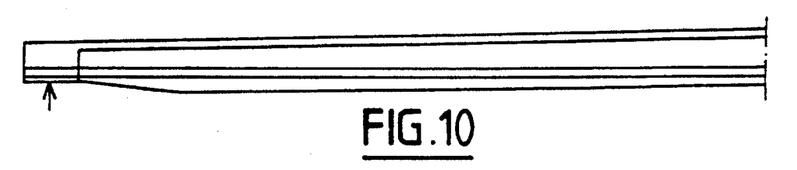
FIG. 10 is a partial elevational view of a beam made of a concrete according to the invention.

The T shaped beam is 10 m long, 0.34 m deep (FIG. 10).

Figure 11A:
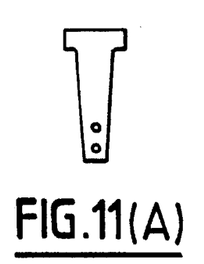
Figure 11B:
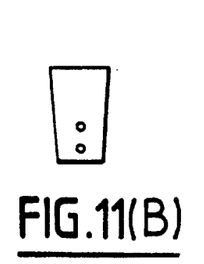

The top flange is 0.15 m wide while the web is 0.06 m thick (FIG. 11).

The beam is prestressed with two 15 mm pretensioned monostrands. The cross section area of the strands is 139 mm². Their yield stress is 1525 MPa and their ultimate limit strength is 1729 MPa. No other reinforcement is being used.

The strands were tensioned at 90% of their yield stress before the casting of the beam.

The load was transferred to the beam at the age of 4 days.

The mean value of the slip-in of the strands at the ends of the beam was 1.6 mm, corresponding to a transmission length of approximately 0.70 m.

At the age of 7 days, steam hot curing was applied for a period of 5 days. Temperature of 80° C. was reached in the concrete of the beam. At the age of load transfer, the bending strength of the concrete was 22 MPa. At the age of testing (21 days), the compressive strength of the concrete was 170 MPa while bending stress was 42 MPa. The Young's modulus was 50 GPa.

Figure 12:
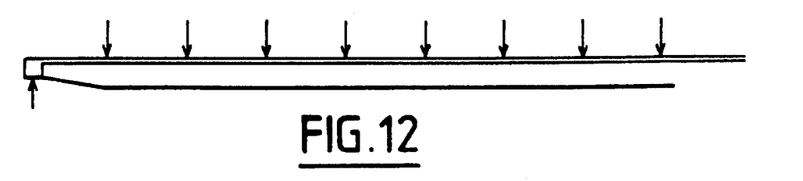
FIG. 12 is a view of the repartition of the hydraulic jacks used to load the beam; 9A

Vertical loads were applied to the beam through eight identical jacks evenly spaced (FIG. 12). The front side of the beam was painted white in order to make microcracks detection easier. The load was gradually applied and deflection at mid-span was measured at each stage.

The beam was first loaded up to 82 kNm and then unloaded. No residual deflection was observed on the unloaded beam.

Figure 13:
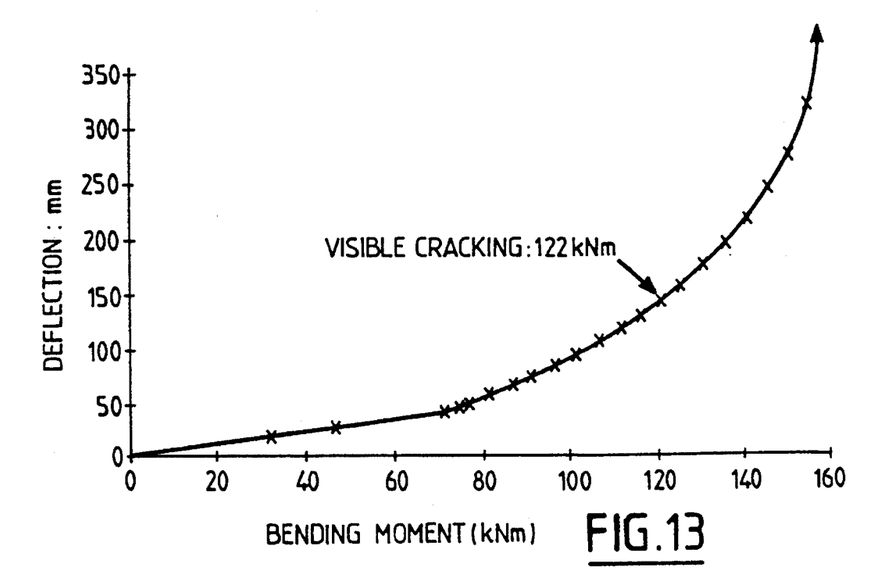
FIG. 13 is a curve of the vertical displacement of the loaded beam at mid span.

During the second loading, cracking appeared when the bending moment was 122 kNm (FIG. 13). The fine cracks were evenly distributed in the central third of the beam at a distance of approximately 0.30 m from each other.

Figure 14:
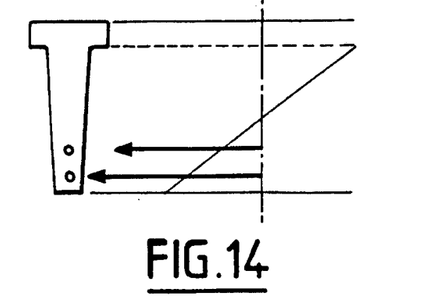
FIG. 14 shows the elastic limit state (ELS) stress distribution.

The corresponding theoretical bottom fiber tensile stress was 39 MPa (FIG. 14) and the top fiber compressive stress was 49 MPa.

Final loading was continued close to ultimate limit state when the bending moment was 147 kNm. In this situation, cracking is no longer distributed but concentrated in three wider cracks. Failure was obtained through rupture of the strands at 157 kNm.

No shear cracking appeared under maximal shear stress of 3.5 MPa. The diffusion zones of concentrated loads above the bearings of the beam remained free of cracks.

The concrete confirmed its ability to sustain all secondary stresses without cracking.

Cracking under primary tensile stress was observed at a very high level. Post cracking behavior showed an additional load capacity of 32% combined with very large deflection.

Altogether this corresponds to a quite satisfactory behavior for practical uses.

The absence of conventional reinforcement allows the use of innovative formwork shapes. This offers opportunity for further improvements of the design of beams.

EXAMPLE III

Figure 15:
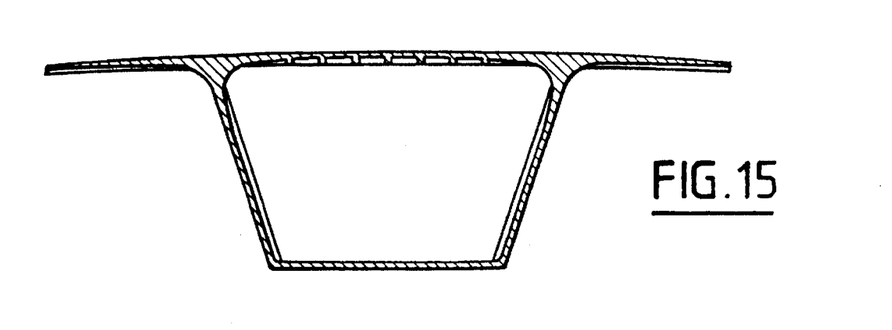
FIG. 15 is the cross section of a bridge deck made of a concrete according to the invention.
Figure 16:
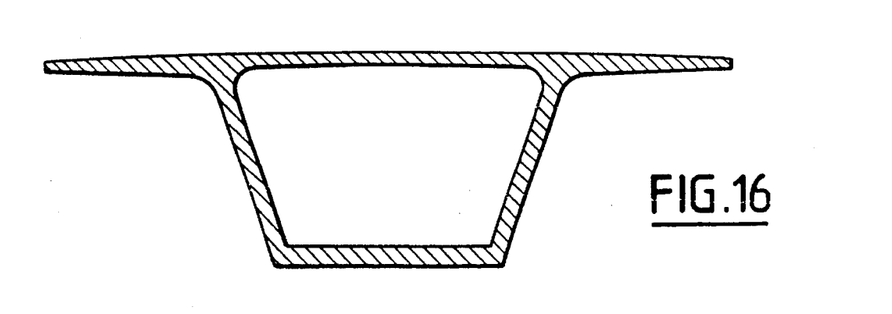
FIG. 16 is the cross section of a bridge deck made of a conventional concrete.

FIG. 15 shows the cross section of a bridge deck made of a concrete as defined in Table 2 whereas FIG. 16 (comparative) shows the cross section of a bridge deck in a conventional concrete and having the same performances.

In both cases, the upper width of the deck is 15.50 m, the lower width is 5.24 m and the height is 5 m.

The volume (m$^3$) of concrete per sqm of deck is 0.23 in the first case and 0.67 in the second case.

EXAMPLE IV

The following process is used for precasting cylindrical trussed girders. The typical diameter of the cylindrical elements is 0.4 meter with a length of 5 meters. The volume of the non reinforced element is 0.63 m$^3$. The trussed girders are post-tensioned after assembling.

The concrete composition is as follows:

TABLE 3

| | |
|---|---|
| High silica modulus Portland Cement | 920 kg/m$^3$ |
| Silica Fume | 212 kg/m$^3$ |
| Crushed Quartz Powder (mean size 10 micrometers) | 359 kg/m$^3$ |
| Sand (max. 0.5 mm) | 662 kg/m$^3$ |
| Calibrated steel fibers (L = 12.7 mm, ø = 0.180 mm) | 184 kg/m$^3$ |
| Polyacrylate superplasticizer (dry exact) | 17 kg/m$^3$ |
| Water | 175 kg/m$^3$ |

Typical mechanical properties of the concrete are listed in the following table:

| | |
|---|---|
| Compressive strength | 190 MPa |
| Flexural strength | 50 MPa |
| E-modulus | 54 GPa |

This concrete is produced in any type of conventional concrete mixers (typically orbital, planetary, high turbulence mixers and mixers with horizontal axes). The mixing process for the production of the concrete is described in the following:

1) Introduction of Concrete Dry Components in the Mixer

Dry components, unless fibers, are introduced in the mixer, sand first, followed by the finest elements and last the cement. Dry components are premixed with a mixing time of typically 30 to 90 seconds.

2) Introduction of the Water and Superplasticizer in the Mixer

The water and the superplasticizer are added at the end of the premix period. The polyacrylate superplasticizer is mixed to the batching water before being dispersed in the mixer.

After introduction of the batching water and before introduction of the fibers, the concrete is mixed during four to seven minutes, depending on the mixer efficiency.

3) Introduction of the Fibers in the Mixer

The fibers are introduced in the mixer over a period of about one minute and the concrete is vibrated to undo the fiber bundles and to guarantee a constant fibre flow.

The mixing procedure is completed two or three minutes after the end of the fiber introduction. The total mixing procedure can be completed within seven to twelve minutes according to the efficiency of the mixer.

Traditional mixing process and mixing equipment can be used for the concrete according the invention but mixing time is about five times longer.

The concrete according to the invention can be molded in the same way as traditional concrete. Truss girder elements are cast vertically with in-situ vibration. External vibration with conventional vibrators can be performed as well.

The element is demoulded 18 hours after concreting.

After demoulding, the truss girder elements are stored in a climate chamber with a relative humidity of 90% at a temperature of 20° C. during seven days. Heat curing at a temperature of 90° C. is then performed during 24 hours using steam jets. Truss girders are then ready for placement and posttensioning operations.

EXAMPLE V

The following composition (parts in weight) is used for making a prismatic test piece of 4 cm by 5 cm cy 60 cm subjected to a 4-point bending test:

TABLE 4

| | |
|---|---|
| Portland Cement Type III | 1 |
| Microsilica from zirconium industry (white) | 0.25 |
| Sand (diameter in the range 0.15 mm–0.5 mm) | 1.03 |
| Calibrated steel fibers (L = 12.7 mm, ø: 0.15 mm) | 0.2 |
| Superplasticizer (dry extract) | 0.014 |
| Water | 0.19 |

Superplasticizer is melamine.

Dry components (unless fibers) are mixed with water and then fibers are added according to a rate of 3 to 10 kgs per second. The mold is vibrated and the test piece is demolded after 16 hours and then heated at 90° C.

For the bending test, the piece is put on two cylinders spaced by 50 cm and the load is progressively applied by means of two cylinders respectively at 10 cm at the right and at 10 cm at the left of the center of the piece. The deformation is measured on the upper fiber (compression) and on the lower fiber (traction) of the piece with strain gauges.

Figure 17:
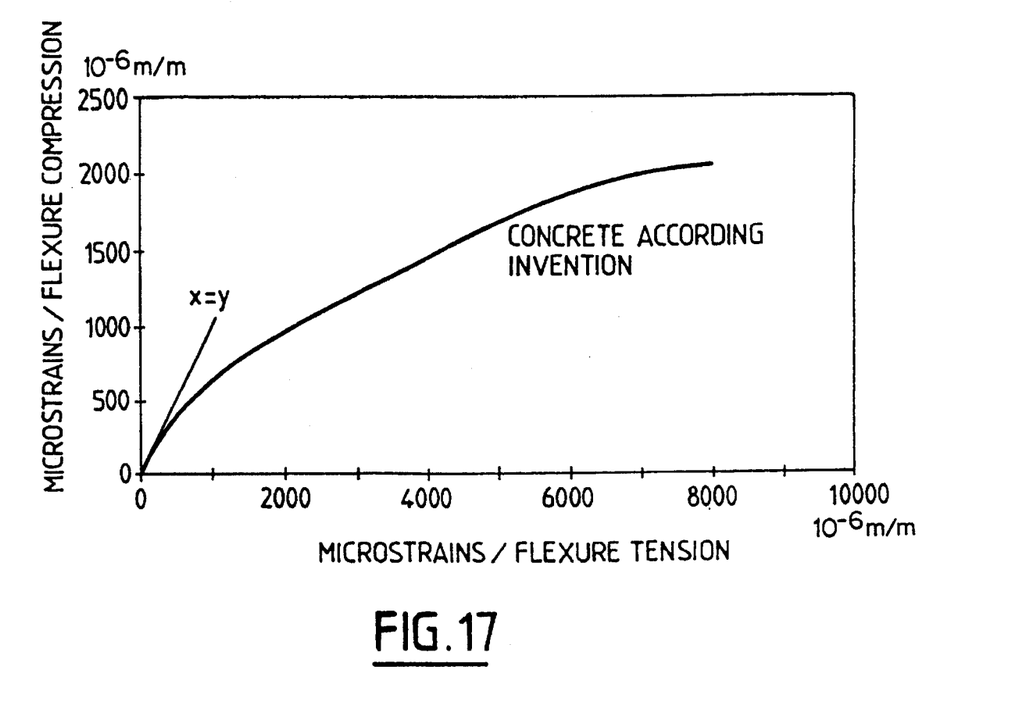
FIG. 17 is a curve showing the ultimate flexural strength of a concrete according to the invention.

The results are shown on FIG. 17 where the ultimate flexural strength of this concrete is 8000 (10$^{-6}$ m/m) as compared to the ultimate flexural strength of a conventional concrete which lies in the range 100–150 (10$^{-6}$ m/m).

We claim:

1. A metal fiber concrete composition to be mixed for providing after setting a concrete element, said composition consisting essentially of a mixture of Portland cement, sand grains, components having a pozzolan reaction with cement, metal fibers, a dispersing agent and water, wherein at least 90% of said sand grains have a maximum grain size D of not more than 800 micrometers, wherein at least 90% of said metal fibers have individual lengths in the range 4–20 mm, said individual lengths forming a mean length L such that a ratio R=L/D is not less than 10, a volume of said metal fibers being in the range of 1–4% of the volume of the concrete after setting, and wherein for 100 p/w of cement, the composition contains at least 60 p/w of said sand grains and at least 10 p/w of said metal fibers.

2. A composition according to claim 1, including per 100 p/w of said Portland cement, 80 to 130 p/w of said sand grains having a mean grain size of 150 to 400 micrometers, 20 to 30 p/w of amorphous silica as said component having a pozzolan reaction with cement having a mean grain size of less than 0.5 micrometer, 15 to 40 p/w of said metal fibers having a mean length lying in the range 10 to 14 mm, and 12 to 20 p/w of water.

3. A composition according to claim 1 wherein said sand grains further comprise crushed quartz powder.

4. A composition according to any one of claims 1 or 3, wherein the volume of said metal fibers is 2% to 3% of the volume of the concrete after setting.

5. A composition according to claim 4, wherein the volume of said metal fibers is about 2.5% of the volume of the concrete after setting.

6. A composition according to any one of claims 1 or 3, wherein said maximum grain size D is not more than 600 micrometers.

7. A composition according to claim 6, wherein said maximum grain size D is not more than 400 micrometers.

8. A composition according to any one of claims 1 or 3, wherein said individual lengths lie in the range of 8 mm to 16 mm.

9. A composition according to claim 8, wherein said individual lengths lies in the range of 10 mm to 14 mm.

10. A composition according to any one of claims 1 or 3, wherein the metal fibers have a diameter lying in the range of 80 micrometers to 500 micrometers.

11. A composition according to claim 10, wherein the metal fibers have a mean diameter lying in the range of 100 micrometers to 200 micrometers.

12. A composition according to any one of claims 1 or 3, wherein the maximum grain size of the sand grains is not greater than 500 micrometers, and wherein the metal fibers have a length between 10 mm and 20 mm.

13. A composition according to any one of claims 1 or 3, wherein said ratio R is not less than 20.

14. A composition according to any one of claims 1 or 3, wherein a dry extract of the dispersing agent is at least 0.5 percent by weight of said cement.

15. A composition according to claim 14, wherein the weight percentage of the dispersing agent with to the cement is about 1.8.

16. A composition according to any one of claims 1 or 3, wherein the Portland cement selected from the group consisting of a Portland cement type V, a Portland cement type III and a high silica modulus Portland cement.

17. A composition according to any one of claims 1 or 3, wherein the metal fibers are selected from the group consisting of stainless steel fibers, steel fibers, non ferrous metal or metal alloy coated stainless steel fibers, and non ferrous metal or metal alloy coated steel fibers.

18. A composition according to any one of claims 1 or 3, wherein said said components having a pozzolanic reaction with cement have a mean granular size of less than 0.5 micrometers.

19. A composition according to any one of claims 1 or 3, wherein said components having a pozzolanic reaction with cement comprise elements selected from the group consisting of silica, fly ash and blast furnace slag.

20. A composition according to claim 19, wherein said silica is silica fume.

21. A composition according to any one of claims 1 or 3, wherein the weight percentage of water to cement is 10 to 30.

22. A composition according to claim 21, wherein the weight percentage of water to the cement is 12 to 20.

23. A composition according to claim 1, including per 100 parts by weight of Portland cement, 60 to 150 parts by weight of said sand grains having a mean grain size of 150 to 400 micrometers, 10 to 40 parts by weight of amorphous silica as said component having a pozzolanic reaction having a mean grain size of less than 0.5 micrometer, 10 to 80 parts by weight of the metal fibers having a mean length lying in the range 4 to 20 mm, at least 0.5 parts by weight of a dry extract of the dispersing agent, and 10 to 30 parts by weight of water.

24. A composition according to any one of claims 2 or 23, wherein the metal fibers are selected from the group consisting of stainless steel fibers, steel fibers, non ferrous metal or metal alloy coated stainless steel fibers, and non ferrous metal or metal alloy coated steel fibers.

25. A composition according to any one of claims 2 or 23, wherein the Portland cement is a Portland cement type V, a Portland cement type III or a high silica modulus Portland cement.

26. A composition according to any one of claims 2 or 23, comprising a superplasticizer as the dispersing agent.

27. A composition according to any one of claims 2 or 23 wherein said sand grains comprise crushed quartz powder.

28. A concrete element obtained by setting of a composition according to any of claims 1, 2, 3 or 23.

* * * * *